June 4, 1940.   E. S. AKER   2,203,039
SHAFT BEARING
Filed Sept. 21, 1939   2 Sheets-Sheet 1
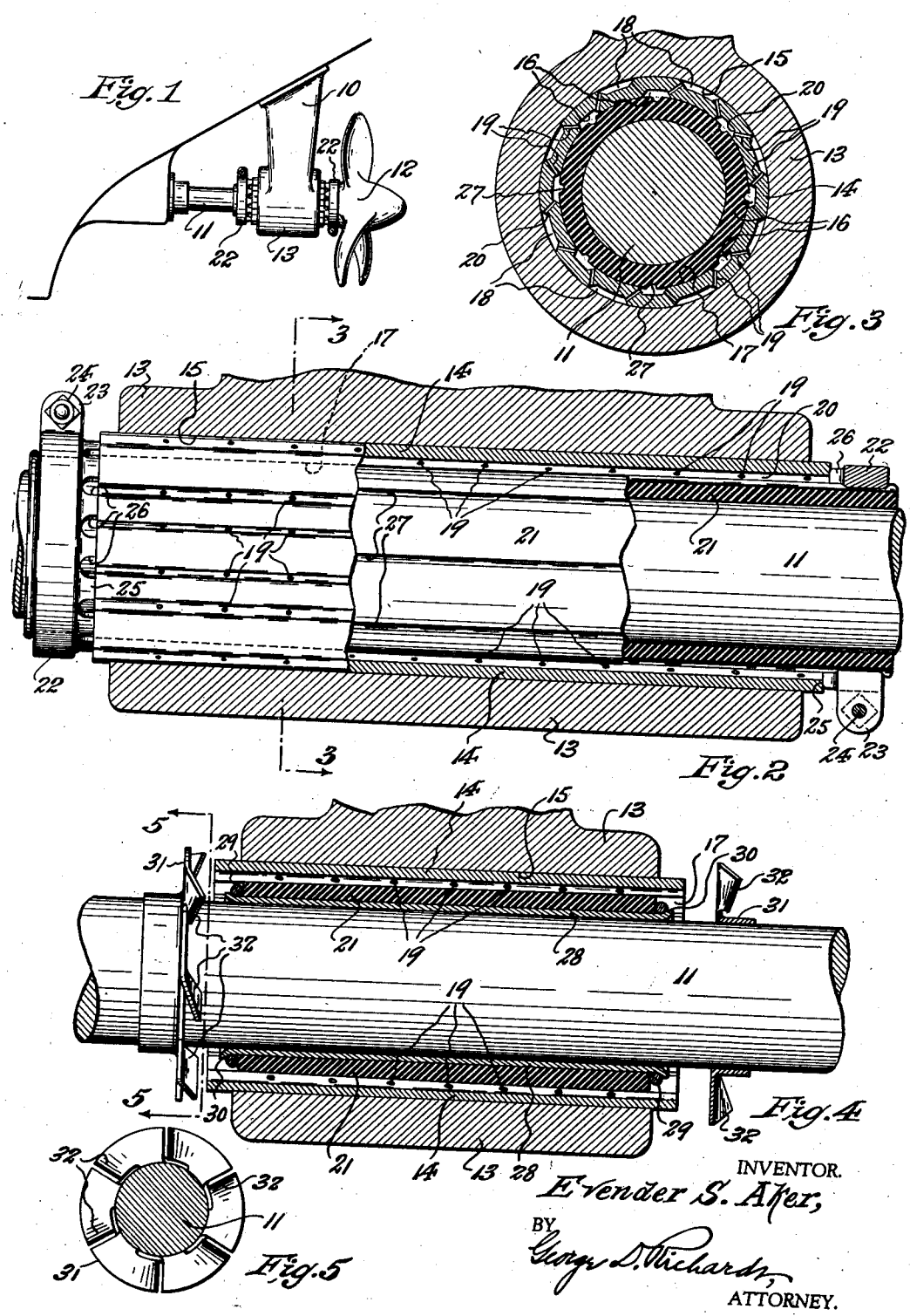
INVENTOR.
Evender S. Aker,
BY George D. Richards,
ATTORNEY.

June 4, 1940.                    E. S. AKER                    2,203,039
                                SHAFT BEARING
                            Filed Sept. 21, 1939              2 Sheets-Sheet 2

INVENTOR.
BY Evender S. Aker,
George D. Richards
ATTORNEY.

Patented June 4, 1940

2,203,039

UNITED STATES PATENT OFFICE 2,203,039

SHAFT BEARING

Evender S. Aker, Long Branch, N. J.

Application September 21, 1939, Serial No. 295,883

13 Claims. (Cl. 308—238)

This invention relates, generally, to improvements in shaft bearings; and the invention has reference, more particularly, to a novel bearing construction of the water lubricated type adapted especially to serve water submerged shafts, such e. g. as the propeller shafts of boats; this application being a continuation in part of my copending application Ser. No. 176,429, filed November 26, 1937.

The invention has for an object to provide a non-scoring or non-cutting bearing constructed to be lubricated by water and including a non-metallic journal sleeve affixed to and rotatable with the shaft which, as lubricated by water, is calculated to reduce running friction and wear to a minimum, while being also adapted to cushion the shaft against undue vibration.

The invention has for another object to provide a novel bearing structure of the kind mentioned, wherein means is provided for efficiently distributing lubricating water uniformly and adequately intermediate the opposed running and stationary surfaces of the bearing elements, and so as to assure efficient and constant flow of the lubricating water through the bearing and relative to the surfaces thereof desired to be lubricated.

Another object of the invention is to provide a novel bearing structure of the kind mentioned, wherein means is provided, if desired, for nicely adjusting the operative relation of the opposed running and stationary surfaces of the bearing elements both initially as well as in compensation for any wear which in time may occur.

Other objects of this invention, not at this time more particularly enumerated, will be understood from the following description of the same.

Illustrative embodiments of this invention are shown in the accompanying drawings, in which:

Fig. 1 is a side elevational view of a strut bracket for supporting the exterior end portion of a boat propeller shaft, the same being equipped with one form of the novel bearing structure according to this invention; Fig. 2 is an enlarged view of said bearing structure with internal parts successively broken away to show the cooperative relations thereof; and Fig. 3 is a transverse sectional view, taken on line 3—3 in Fig. 2.

Fig. 4 is a longitudinal sectional view of another embodiment of the bearing structure according to this invention; and Fig. 5 is a transverse sectional view, taken on line 5—5 in said Fig. 4.

Similar characters of reference are employed in the above described views, to indicate corresponding parts.

Figure 6:
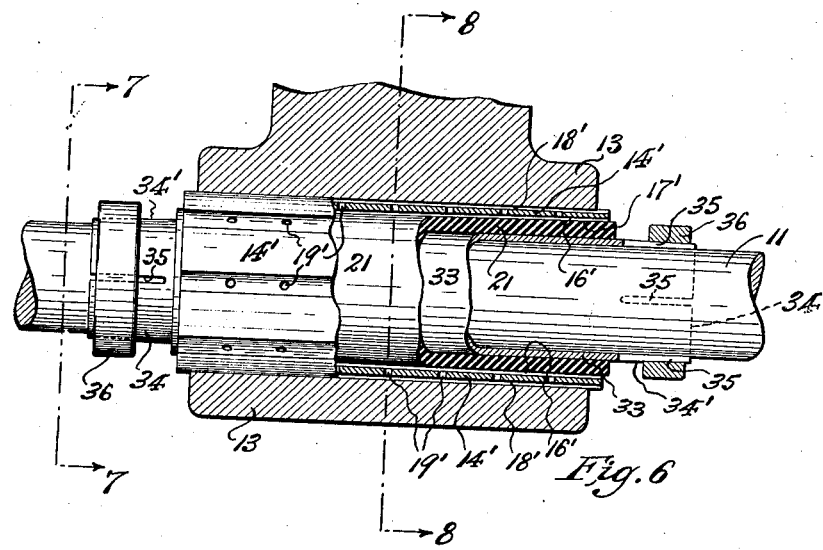
Fig. 6 is a view showing still another embodiment of the bearing structure according to this invention, with internal parts thereof successively broken away to show the cooperative relations thereof.

To illustrate one use of the novel bearing structure, the same is shown as applied to and supported within the bearing block 13 of a strut bracket 10 for carrying the external end of a boat propeller shaft 11, upon the outer extremity of which the propeller 12 is affixed. It will be understood, however, that I do not limit the use of the bearing structure of this invention to such purpose, since the same may be employed for machinery shafts of all kinds, especially where such shafts are operated under wet conditions or wholly or partially submerged in water.

The novel bearing structure comprises a bushing of novel construction adapted to be fixed and supported in a bearing block 13 through which the shaft 11 extends, said shaft having, suitably affixed thereon, a non-metallic journal sleeve to turn in said bushing.

The bushing element 14 of the bearing structure comprises a tubular body adapted to be suitably affixed within the bore 15 of the bearing block 13. One method of so affixing said bushing body 14 is to so size the same as to its external diameter that it is subject to a tight drive fit within the bearing block bore 15, whereby a strong frictional resistance to displacement is attained. It will be understood however that any other method or means for attaching the bushing body 14 so that the same will be held in stationary supported relation to the bearing block 13 may be resorted to.

Said bushing body is so formed as to provide a plurality of longitudinally disposed and circumferentially spaced endwise open internal and external channels or grooves, and the bushing walls are further provided with transverse openings disposed to afford communication between internal and external channels. Since said channels are open from end to end, the same afford free ingress and egress to the flow of lubricating water in considerable volume through the bearing structure, and so as to be brought in contact with the surfaces of a rotating journal sleeve engaged in the bore of said bushing body. Furthermore, said transverse openings, by providing communication between the internal and external water flow channels or grooves, permit the water to pass from internal channels to external channels by an action analogous to a pumping action which results from the rotary movement of the journal sleeve in the bushing body, thereby effecting an assisted or forced circulation or distributing movement of water throughout the bearing, and so that bathing of the entire areas of the opposed surfaces of the journal sleeve and bushing body with lubricating water is assured.

In the form of the bushing body 14 as shown in Figs. 2, 3 and 4 of the drawings, the same is provided in its internal side with a plurality of longitudinally disposed circumferentially spaced channels or grooves 16 extending from end to end thereof and indenting the surface of its bore 17. In like manner, said bushing body is also provided in its external side with a like plurality of longitudinally disposed circumferentially spaced channels or grooves 18 extending from end to end thereof and indenting its external surface. In this embodiment, the external channels or grooves 18 are so arranged, as to their circumferentially spaced positions, as to lie, radially, between the internal channels or grooves 16, in other words so that the internal and external channels or grooves are in staggered or alternated relation. Intercommunication of adjacent internal and external channels or grooves 16 and 18 is afforded by provision of suitably spaced through openings 19 in the bushing body wall webs 20. The bushing body may be made of any suitable material; preferably, however, the same is made of a non-corrosive metal or metallic alloy.

That portion of the shaft 11 which is supported by the bearing structure is provided with a journal sleeve 21. This journal sleeve 21 is made of a non-metallic material. For example, the same is preferably made of vulcanized rubber. I have found that a hard rubber material is very satisfactory for the purpose, but it is also possible to use a rubber, as e. g. a soft or comparatively soft vulcanized rubber.

The journal sleeve 21, when made of either hard or soft vulcanized rubber, may be affixed to the shaft 11 in any suitable manner so as to rotate therewith. It may, for example, be vulcanized directly upon the shaft and thus bonded thereto; it may be cemented to the shaft; or it may be mechanically affixed to the shaft by suitable means. By way of example, one method of mechanically affixing the journal sleeve 21 to the shaft 11 is shown in Fig. 2, wherein said journal sleeve is shown to be of a length substantially exceeding the length of the bushing body 14 and its supporting bearing block 13, whereby end portions of the journal sleeve are disposed to freely project respectively beyond the ends of said bushing body 14 and bearing block 13. Encircling said projecting end portions of the journal sleeve are split clamp rings 22, having perforate ears 23 at their split forming terminations through which clamp bolt and nut fastening means 24 are engaged to draw said split forming terminations together, thereby to constrict said clamp rings 22 about the journal sleeve end portions, thus tightly and immovably uniting or binding said sleeve to the shaft 11. If desired, said clamp rings 22 may be provided at their inner sides with annular flanges 25 to abut the ends of the bushing body 14, to thus retain the latter and said journal sleeve in desired mutually adjusted relation. Said flanges 25 are provided with circumferentially spaced indented notches or openings 26 to provide water communication to the grooves or channels of said bushing body 14.

In bearing structures wherein it is desirable to permit of nicely adjusting the operative relation of the opposed surfaces of the assembled bushing body 14 and journal sleeve 21, both initially as well as in compensation for wear, the bore 17 of the former is made of slightly tapering formation from one end to the other, as for example, from its right hand end to its left hand end, as shown in Fig. 4 of the drawings more especially, and the journal sleeve 21 is externally tapered to correspond to such internal taper. It will be obvious, by reason of such tapered formation, that easy and quick relative adjustment of the opposed bushing body and journal sleeve surfaces may be accomplished by longitudinally shifting the bushing body relative to the journal sleeve or vice versa.

In Fig. 4 there is shown a somewhat modified form of bearing embodying the principles of this invention, but involving another method of attaching the journal sleeve to the shaft. In this modified arrangement, the bushing body 14 is shown to possess the same structural characteristics already above described. The journal sleeve 21 is also, per se, similar to that above described, but the method of its attachment to the shaft 11 is somewhat different. Instead of directly vulcanizing or cementing the rubber journal sleeve to the shaft, the bore of said journal sleeve is provided with a tubular metallic liner sleeve 28, which is of such internal diameter as to be capable of being slid onto the shaft 11 with a force or drive fit calculated to hold the journal sleeve in fixed relation to the shaft for rotation therewith. The rubber journal sleeve is bonded to the liner sleeve 28 by vulcanization or cementing, and the affixed relation of the liner sleeve 28 to the shaft 11 may be further assured by applying over and shrinking onto projecting end portions of said liner sleeve keeper rings 29 and then flaring the extremities of the liner sleeve to form retaining flanges 30 to abut the exterior sides of said keeper rings.

In Fig. 4 I have also shown additional means for assisting the flow of water into and through the bushing body channels or grooves; said means comprising one or more impeller devices 31 which are affixed to the shaft 11 so as to rotate therewith, and so as to be disposed preferably adjacent to each end of the bearing. The impeller device is provided with suitably pitched vanes 32 adapted to exert a driving thrust upon the water in which the bearing structure is submerged. An impeller device mounted on the shaft 11 adjacent to the open ends of said channels or grooves may have its vanes 32 so pitched as to pump water through the adjacent open ends of said channels or grooves so as to assure filling of the same. Such impeller may be utilized at one end only of the bearing, but, optionally, a second impeller device may also be arranged at the opposite end of the bearing, the vanes 32 of this second impeller being preferably disposed so as to exert a water exhausting effect upon the bushing body channels or grooves, thus maintaining a constant flow of water through the latter from one end to the other thereof.

Figure 7:
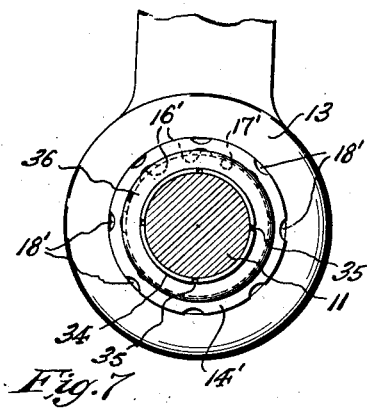
Fig. 7 is a transverse sectional view, taken on line 7—7 in Fig. 6, but showing said bearing structure in end elevation.
Figure 8:
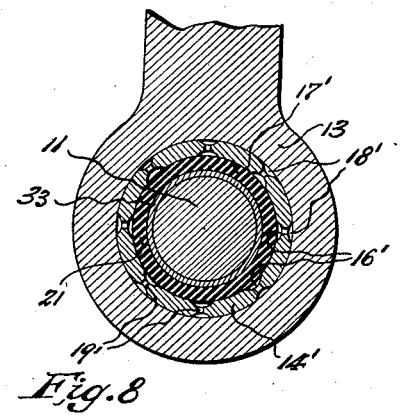
Fig. 8 is a transverse sectional view, taken on line 8—8 in said Fig. 6.

In Figs. 6 to 8 inclusive there is shown another form of bearing structure embodying the principles of this invention, but involving both a somewhat modified form of bushing body as well as exemplifying another and preferred method of attaching the journal sleeve to the shaft. In this form of bearing, the bushing body 14' is provided in its internal side with a plurality of longitudinally disposed circumferentially spaced channels or grooves 16' extending from end to end thereof and indenting the surface of its bore 17', and, in its external side, said bushing body 14' is provided with a plurality of longitudinally disposed circumferentially spaced channels or grooves 18' extending from end to end thereof and indenting its external surface. In this embodiment, the internal and external channels or grooves 16' and 18' are relatively disposed in radially or substantially radially aligned relation, and intercommunication of so aligned internal and external channels or grooves 16' and 18' is afforded by provision of suitably spaced through openings 19' in the wall webs intermediate the same. Such arrangement of the intercommunicating internal channels or grooves has been found to give very satisfactory lubricating water flow distribution and to give rise to the desirable water distributing pumping effect induced by the rotation of the journal sleeve within the bore of the bushing body, as heretofore mentioned. The means for affixing the journal sleeve 21 to the shaft 11, as shown in Figs. 6 and 7 more especially, comprises the provision of a tubular metallic liner sleeve 33, upon the external surface of which the journal sleeve 21 is bound by vulcanization or cementing. Said liner sleeve 33 is of an overall length exceeding the length of the journal sleeve 21 and the bushing body with which it cooperates, thus providing exteriorly and freely projecting end-portions 34. These end portions 34 are indented by a plurality of longitudinally directed and circumferentially spaced slits 35, and the said end portions are of external tapering conformation, as shown at 34' in Fig. 6. The liner sleeve 33 is of an internal diameter permitting the same to be slid onto the shaft 11 with a snug or close fit. After the liner sleeve 33 is positioned on the shaft 11, so as to dispose the journal sleeve 21 carried thereby in proper operative relation to the bushing body with which it is to cooperate, said liner sleeve is bound to the shaft 11 against longitudinal displacement and so as to rotate therewith, by driving correspondingly internally tapered lock rings 36 onto the tapered and split end portions 34 thereof. Said lock rings 36, when driven home, strongly contract said split end portions 34 so as to firmly and immovably bind the liner sleeve upon the shaft 11.

When the bearing structure is assembled for use, the opposed surfaces of the bushing body and journal sleeve are preferably related so as to provide intermediate clearance approximating five one-thousandths of an inch. As a consequence of this a film of lubricating water is constantly interposed and maintained between said opposed surfaces.

Under operating conditions, with the bearing and shaft submerged in water, lubricating water will enter and fill the grooves or channels 16—18 or 16'—18' of the bushing body. As the journal sleeve rotates within the bushing body, tests have shown that an action analogous to a pumping action is set up whereby the water is caused to flow from the internal channels of the bushing body to the external channels thereof, thus constantly drawing water into the former channels via open ends thereof, and expelling the same through intermediate openings 19 or 19' to the external channels. By such action a constant flow of water through the internal channels with lubricating film forming effect is assured, and so that such lubricating film constantly and uniformly bathes the opposed surfaces of said rotating journal sleeve and stationary bushing body.

In order to further enhance constant and uniform distribution of the lubricating water upon and between the opposed surfaces of the bushing body and rotating journal sleeve, the external surface of the latter element may, optionally, be also provided with longitudinally extending circumferentially spaced carrier pockets or channels 27, which, as the journal sleeve rotates, will tend to carry water in somewhat increased volume beneath and over the bushing body bore surfaces, intermediate the internal channels or grooves 16 or 16', and so as to further assure the spreading and maintenance thereupon of the desired lubricating water film. Said carrier pockets or channels 27 may extend either parallel to the axis of rotation of the journal sleeve or somewhat obliquely thereto.

From the above it will be obvious that a very efficient distributive flow of lubricating water between the operative opposed bearing surfaces of the bearing is assured at all times under running conditions; and furthermore owing to the pumping action referred to the resultant forced movement of the water tends to wash or carry away sand or grit so as to prevent accumulations thereof in the water passageways of the bearing, a result much to be desired especially when the bearing is used for marine purposes.

I am aware that various changes, other than those already hereinabove referred to, could be made in the bearing structure of this invention, and many apparently widely different embodiments of the invention could be made without departing from the scope thereof as defined by the folowing claims. It is therefore intended that all matter contained in the above description or shown in the accompanying drawings shall be interpreted as illustrative and not in a limiting sense.

I claim:

1. In a shaft bearing, the combination with a housing block of a non-rotatable bushing body mounted therein, the body having a plurality of longitudinal water channels circumferentially spaced about the bore thereof and open at their ends and also having openings through its wall communicating with the channels, and a non-metallic journal sleeve secured to said shaft to rotate therewith and in contact with the bore surface of the bushing body.

2. In a shaft bearing, the combination with a housing block of a non-rotatable bushing body mounted therein, the body having a plurality of longitudinal water channels circumferentially spaced about the bore thereof and open at their ends and also having openings through its wall communicating with the channels, a metallic sleeve lying within the bushing body and secured to the shaft to rotate therewith, and a non-metallic journal sleeve fast on the external surface of the metallic sleeve to rotate with the shaft and in contact with the bore surface of the bushing body.

3. In a shaft bearing, the combination with a housing block of a non-rotatable bushing body mounted therein, the body having a plurality of longitudinal endwise open water channels circumferentially spaced about and open to the bore thereof, said bushing body also having openings through its wall leading from said channels to similar channels provided between said bushing body and housing block, and a non-metallic journal sleeve secured to said shaft to rotate therewith and in contact with the bore surface of the bushing body.

4. In a shaft bearing, the combination with a housing block of a non-rotatable bushing body mounted therein, the body having a plurality of internal and external longitudinal water channels spaced about the bore thereof and open at their ends, said bushing body also having openings through its wall between internal and external channels, and a non-metallic journal sleeve secured to said shaft to rotate therewith and in contact with the bore surface of the bushing body.

5. In a shaft bearing, the combination with a housing block of a non-rotatable bushing body mounted therein, the body having a plurality of internal and external longitudinal water channels spaced about the bore thereof and open at their ends, said bushing body also having openings through its wall between internal and external channels, a metallic sleeve mounted on the shaft to lie within the bushing body, said sleeve having externally tapered split end portions, lock rings on said sleeve end portions to contract the same into bound relation to said shaft to thereby secure said sleeve to the latter for rotation therewith, and a non-metallic journal sleeve fast on the outer surface of the metallic sleeve to rotate therewith and with the shaft and in contact with the bore surface of the bushing body.

6. In a shaft bearing as defined in claim 1, wherein the bushing body bore and the external face of said journal sleeve are correspondingly tapered for relative adjustment one to the other.

7. In a shaft bearing of the kind described, the combination with a housing block of a non-rotatable bushing body frictionally engaged with said block subject to endwise movement for adjustment, said bushing body having a plurality of longitudinal endwise open water distributing channels circumferentially spaced around the bore thereof, and a non-metallic journal sleeve fixed upon the shaft for rotation within said bushing body, the bore of said bushing body and the external face of said journal sleeve being correspondingly tapered, whereby relative endwise movement between said bushing body and sleeve in directions of taper is adapted to adjust the opposed surfaces thereof to desired predetermined operating relation.

8. In a shaft bearing of the kind described, the combination with a housing block of a stationary bushing body having a plurality of longitudinal endwise open water distributing channels circumferentially spaced around both its internal and external faces, the external channels being located in alternate relation to the internal channels, means affording transverse communication between adjacent external and internal channels, and a rubber journal sleeve fixed upon the shaft for rotation within said bushing body, the bore of said bushing body and the external face of said journal sleeve being correspondingly tapered for the purposes set forth.

9. In a shaft bearing of the kind described, the combination with a housing block of a stationary bushing body having a plurality of longitudinal endwise open water distributing channels circumferentially spaced around both its internal and external faces, the external channels being located in alternate relation to the internal channels, means affording transverse communication between adjacent external and internal channels, and a rubber journal sleeve fixed upon the shaft for rotation within said bushing body, the bore of said bushing body and the external face of said journal sleeve being correspondingly tapered for the purposes set forth, and said journal sleeve having a plurality of circumferentially spaced longitudinal pockets in the external face thereof.

10. In a shaft bearing as defined in claim 8, wherein the rubber journal sleeve exceeds in length the length of the housing body so as to provide the former with exteriorly projecting end portions, and clamp rings embracing said end portions to bind said journal sleeve to the shaft.

11. A shaft bearing structure comprising, a housing block, a stationary bushing body having a plurality of longitudinal endwise open water distributing chanels circumferentially spaced around both its internal and external faces, the external channels being located in alternate relation to the internal channels, means affording transverse communication between adjacent external and internal channels, a rubber journal sleeve fixed upon the shaft for rotation within said bushing body, and water impelling means also fixed upon the shaft for rotation therewith and adapted on rotation to effect movement of water into and through said channels.

12. A shaft bearing structure comprising, a housing block, a stationary bushing body having a plurality of longitudinal endwise open water distributing channels circumferentially spaced around the same and laterally open to the interior thereof, a rubber journal sleeve fixed upon the shaft for rotation within said bushing body, said bushing body bore and the external face of said journal sleeve being correspondingly tapered for relative adjustment one to the other, and water impelling means also fixed upon said shaft for rotation therewith and adapted on rotation to force water into said channels from one end of the bushing body for discharge from said channels at the other end of said bushing body.

13. In a shaft bearing structure as defined in claim 11, wherein the bushing body bore and the external face of said journal sleeve are correspondingly tapered for relative adjustment one to the other.

EVENDER S. AKER.